United States Patent
Alfarano et al.

(10) Patent No.: US 10,623,344 B2
(45) Date of Patent: *Apr. 14, 2020

(54) MESSAGE PROCESSING USING DEACTIVATION CONDITION AND AFTER SCHEDULED END TIME

(71) Applicant: International Business Machines Corporation, Armonk, NY (US)

(72) Inventors: Luca Alfarano, Blanchardstown (IE); Srinivas Allampally, Navan (IE); Gaurav Bhagat, Blachardstown (IE); Conor T. Boland, Mulhuddart (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/020,893

(22) Filed: Jun. 27, 2018

(65) Prior Publication Data
US 2018/0309700 A1 Oct. 25, 2018

Related U.S. Application Data

(63) Continuation of application No. 14/993,794, filed on Jan. 12, 2016, now Pat. No. 10,027,608, which is a continuation of application No. 14/027,209, filed on Sep. 15, 2013, now Pat. No. 9,276,881, which is a continuation of application No. 13/731,427, filed on Dec. 31, 2012, now Pat. No. 9,282,067.

(51) Int. Cl.
G06F 15/16 (2006.01)
H04L 12/58 (2006.01)
H04L 29/08 (2006.01)

(52) U.S. Cl.
CPC ............. *H04L 51/02* (2013.01); *H04L 51/22* (2013.01); *H04L 67/306* (2013.01)

(58) Field of Classification Search
CPC ....... H04L 51/02; H04L 51/22; H04L 67/306; H04L 51/14; H04W 4/14
USPC ................................................ 709/201–206
See application file for complete search history.

(56) References Cited

U.S. PATENT DOCUMENTS

| | | | |
|---|---|---|---|
| 5,555,346 A * | 9/1996 | Gross | G06N 5/022 706/45 |
| 6,442,589 B1 | 8/2002 | Takahashi et al. | |
| 7,499,973 B2 | 3/2009 | Couts et al. | |

(Continued)

OTHER PUBLICATIONS

"Customizing the out-of-office auto-reply based on sender information," [online] IP.com Prior Art Database, Disclosure No. IPCOM000130501D, Oct. 25, 2005, retrieved from the Internet: <http://ip.com/IPCOM/000130501>, 1 pg.

(Continued)

*Primary Examiner* — Liang Che A Wang
*Assistant Examiner* — Kaylee J Huang
(74) *Attorney, Agent, or Firm* — Cuenot, Forsythe & Kim, LLC

(57) ABSTRACT

Message processing includes activating an out-of-office function for a messaging account, wherein the out-of-office function has a scheduled end time. A determination is made, using a processor, that a current time is after the scheduled end time and that a deactivation condition for the out-of-office function has not occurred. Responsive to the determination, an out-of-office action is performed using the processor.

6 Claims, 4 Drawing Sheets

(56) References Cited

U.S. PATENT DOCUMENTS

| | | | | |
|---|---|---|---|---|
| 7,865,458 | B2* | 1/2011 | Callanan | G06Q 10/107 706/45 |
| 9,276,881 | B2 | 3/2016 | Alfarano et al. | |
| 9,282,067 | B2 | 3/2016 | Alfarano et al. | |
| 2005/0021636 | A1 | 1/2005 | Kumar | |
| 2005/0132006 | A1 | 6/2005 | Horvitz et al. | |
| 2005/0188030 | A1 | 8/2005 | Hudecek | |
| 2008/0104175 | A1 | 5/2008 | Keohane et al. | |
| 2008/0104177 | A1 | 5/2008 | Keohane et al. | |
| 2008/0133302 | A1* | 6/2008 | Brauninger | G06Q 10/109 379/88.19 |
| 2009/0150500 | A1 | 6/2009 | Kumar et al. | |
| 2010/0146059 | A1 | 6/2010 | Dellafera et al. | |
| 2010/0318615 | A1* | 12/2010 | Griffin | G06Q 10/107 709/206 |
| 2011/0191424 | A1* | 8/2011 | Cumming | G06F 15/16 709/206 |
| 2011/0246580 | A1 | 10/2011 | Goldman et al. | |
| 2011/0258276 | A1* | 10/2011 | Robins | G06Q 10/107 709/206 |
| 2014/0189020 | A1 | 7/2014 | Alfarano et al. | |
| 2014/0189024 | A1 | 7/2014 | Alfarano et al. | |
| 2016/0127278 | A1 | 5/2016 | Alfarano et al. | |
| 2016/0127279 | A1 | 5/2016 | Alfarano et al. | |

OTHER PUBLICATIONS

Moore, K., "Recommendations for automatic responses to electronic mail," [online] Request for Comments 3834, The Internet Society, Network Working Group, Aug. 2004, retrieved from the Internet: <http://etherpad.tools.ietf.org/pdf/rfc3834.pdf>, 23 pgs.

"Usermanager—Dungog Wiki," [online] Dungog.net, Oct. 22, 2009 [retrieved Nov. 14, 2012] retrieved from the Internet: <http://dungog.net/wiki/Usermanager>, 8 pgs.

Nigam, A., "Automatically enable Out of Office (OoO) message when you close Outlook," [online] Exiled to live . . . Un Mono en la Selva, May 24, 2010 [retrieved Nov. 14, 2012] retrieved from the Internet: <http://blog.akshatnigam.com/2010/05/automatically-enable-out-of-office-ooo.html>, 3 pgs.

"University of Liverpool—Computing Services—Email," [online] University of Liverpool, a Member of the Russel Group [retrieved Nov. 27, 2012] retrieved from the Internet: <http://www.liv.ac.uk/csd/email/>, 3 pgs.

Outlook Team, Macbeth, M., "Preparing to be away," [online] Outlook Blogs, Microsoft Corporation, Nov. 24, 2008, [retrieved Dec. 28, 2012] retrieved from the Internet: <http://blogs.office.com/b/microsoft-outlook/archive/2008/11/25/preparing-to-be-away.aspx>, 3 pgs.

Frak, B., "Out of Office Lotus Notes 8 vs. 7," [online] Insight Bulletin, IT Services, vol. 22, No. 1, Winter 2009, Univ. of Windsor, retrieved from the Internet: <http://web4.uwindsor.ca/units/its/insight/insight.nsf/937f4f2b9ee4bec585256849000f7fcd/f92938479fe2f123852575440055dc14!OpenDocument>, 4 pgs.

"Manage another person's mail and calendar items," [online] Office, Outlook Help, Microsoft Corporation © 2012 [retrieved Dec. 28, 2012] retrieved from the Internet: <http://office.microsoft.com/en-us/outlook-help/manage-another-person-s-mail-and-calendar-items-HA010355561.aspx>, 3 pgs.

U.S. Appl. No. 13/731,427, Non-Final Office Action, dated Oct. 20, 2014, 16 pg.

U.S. Appl. No. 13/731,427, Final Office Action, dated Jun. 1, 2015, 10 pg.

U.S. Appl. No. 13/731,427, Notice of Allowance, dated Nov. 12, 2015, 11 pg.

U.S. Appl. No. 14/027,209, Non-Final Office Action, dated Oct. 24, 2014, 13 pg.

U.S. Appl. No. 14/027,209, Non-Final Office Action, dated May 7, 2015, 13 pg.

U.S. Appl. No. 14/027,209, Final Office Action, dated Jun. 8, 2015, 7 pg.

U.S. Appl. No. 14/027,209, Notice of Allowance, dated Nov. 12, 2015, 10 pg.

U.S. Appl. No. 14/993,741, Non-Final Office Action, dated May 26, 2017, 23 Pg.

U.S. Appl. No. 14/993,741, Final Office Action, dated Sep. 11, 2017, 26 Pg.

U.S. Appl. No. 14/993,741, Notice of Allowance, dated Mar. 14, 2018, 10 Pg.

U.S. Appl. No. 14/993,741, Corrected Notice of Allowance, dated Mar. 30, 2018, 8 Pg.

U.S. Appl. No. 14/993,794, Non-Final Office Action, dated May 18, 2017, 21 Pg.

U.S. Appl. No. 14/993,794, dated Final Office Action, Sep. 14, 2017, 23 Pg.

U.S. Appl. No. 14/993,794, Notice of Allowance, dated Mar. 14, 2018, 9 Pg.

U.S. Appl. No. 14/993,794, Corrected Notice of Allowance, dated Apr. 4, 2018, 7 Pg.

\* cited by examiner

300

305 — ○ Do not send out-of-office messages
310 — ● Send out-of-office messages
315 — Start time [Start Date ▼] [Start Time ▼]
320 — End time [End Date ▼] [End Time ▼]

Out-of-Office Message Text

325 — I will be out of the office until January 10, 2012. I will respond to your inquiry at that time.

330 — ● Enable extended out-of-office
335 — Extended End Time [End Date ▼] [End Time ▼]

Extended Out-of-Office Message Text

340 — Unfortunately, I will be out of the office longer than expected due to circumstances beyond my control. Your inquiry has been forwarded to my backup, who will contact you shortly.

Extended Out-of-Office Message Text

345 — Rule 1: forward messages from ibm.com to User A
Rule 2: forward messages from User B to User C
Rule 3: forward other messages to User D

FIG. 3

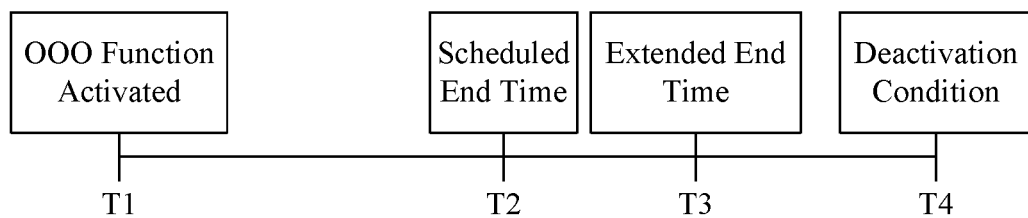

| OOO Function Activated | | Scheduled End Time | Extended End Time | | Deactivation Condition |
|---|---|---|---|---|---|
| T1 | | T2 | T3 | | T4 |

FIG. 4

MESSAGE PROCESSING USING DEACTIVATION CONDITION AND AFTER SCHEDULED END TIME

BACKGROUND

When a user of a messaging system, e.g., electronic mail, is out of the office for a period of time, the user typically activates an automated reply function. The automated reply function automatically sends a reply in response to each message that is received in the user's messaging account. The automated reply typically includes text indicating when the user will be back in the office and able to respond to the message that triggered the automated reply.

In some cases, the user is out of the office for longer than anticipated without access to the messaging system. As the date noted in the automated reply comes and goes, people attempting to contact the absent user that previously received an automated reply expect some sort of follow-up action to occur based upon the assumption that the absent user is back in the office.

When no follow-up action occurs, people may become frustrated by the lack of action while remaining unaware that the absent user is still not in the office. Further, when one sends a further message to the absent user, the same automated reply may be received in response, which now includes incorrect and out-of-date information. Alternatively, no further automated message is sent. In either case, the person trying to contact the absent user may interpret the lack of action or contact that the absent user is choosing not to respond when in fact the absent user is unable to respond.

BRIEF SUMMARY

A method includes activating an out-of-office (OOO) function for a messaging account, wherein the OOO function has a scheduled end time. The method also includes determining, using a processor, that a current time is after the scheduled end time and that a deactivation condition for the OOO function has not occurred. The method further includes, responsive to the determining, performing an OOO action using the processor.

A system includes a processor programmed to initiate executable operations. The executable operations include activating an OOO function for a messaging account, wherein the OOO function has a scheduled end time, and determining that a current time is after the scheduled end time and that a deactivation condition for the OOO function has not occurred. The executable operations also include performing an out-of-office action responsive to the determining.

A computer program product includes a computer readable storage medium having program code stored thereon. The program code is executable by a processor to perform a method. The method includes activating, using the processor, an OOO function for a messaging account, wherein the OOO function has a scheduled end time, and determining, using the processor, that a current time is after the scheduled end time and that a deactivation condition for the OOO function has not occurred. The method further includes, responsive to the determining, performing an OOO action using the processor.

BRIEF DESCRIPTION OF THE SEVERAL VIEWS OF THE DRAWINGS

FIG. 3 is a block diagram illustrating an exemplary window of a user interface for an out-of-office function.

FIG. 4 is a timeline illustrating an example of out-of-office message processing.

DETAILED DESCRIPTION

Figure 1:
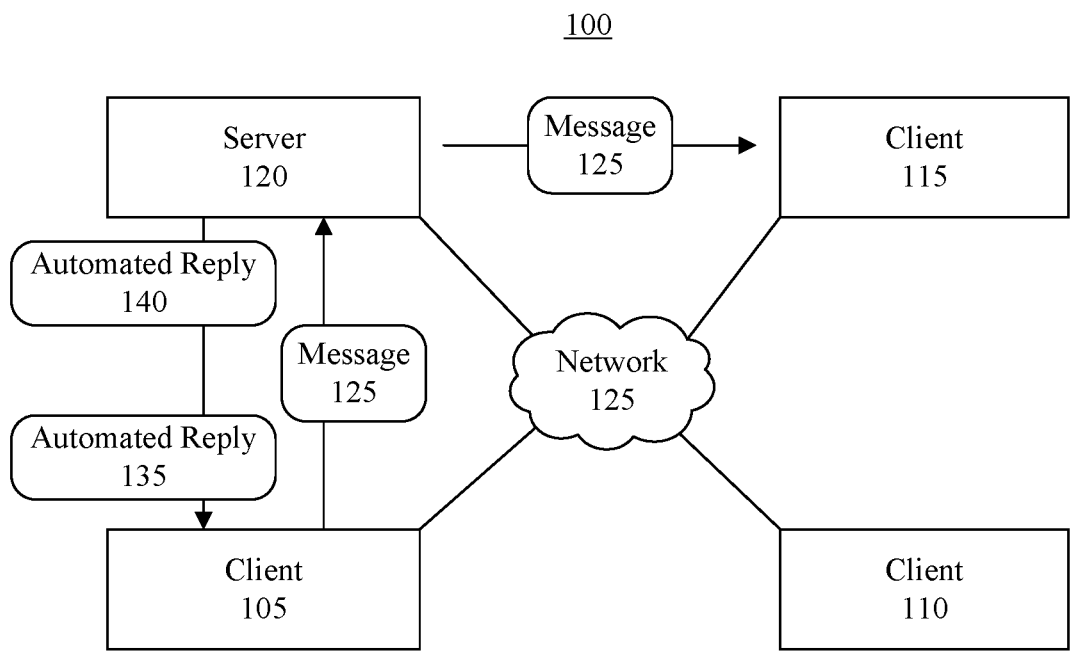
FIG. 1 is a block diagram illustrating an exemplary messaging system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments relate to out-of-office (OOO) message processing. In accordance with the inventive arrangements disclosed herein, OOO message processing is provided in which a message directed to a first recipient can be forwarded to one or more alternative, or second, recipients under particular circumstances. Automated replies to received messages can be sent. Depending upon the circumstances in which a message is received while an OOO function is activated, an alternative automated reply can be sent. The alternative automated reply can indicate that the first recipient is out of the office longer than anticipated. Further aspects of the embodiments are described with reference to the figures below.

FIG. 1 is a block diagram illustrating an exemplary messaging system 100. As pictured, messaging system 100 includes clients 105, 110, and 115 and a server 120. Each of clients 105-115 is implemented as a data processing system executing suitable client messaging software. Server 120 is implemented as a data processing system executing suitable server messaging software. Clients 105-115 and server 120 are communicatively linked through a network 125. Network 125 can be implemented as, or include, any of a variety of different networks such as a WAN, a LAN, a wireless network, a mobile network, a Virtual Private Network (VPN), the Internet, or the like.

Each of clients 105-115 is associated with a particular messaging address, e.g., an electronic mail (email) address, for the purpose of routing messages. A messaging address uniquely identifies a messaging account. Within this specification, while reference is made to sending messages to a particular client, user, recipient, etc., it should be appreciated that the message is being sent to a particular messaging address, and as such, a particular messaging account, associated with the user, client, and/or recipient as the case may be. A "user" refers to a human being operating a data processing system. In this regard, a sender also refers to a user with an associated messaging address. For ease of illustration, it is assumed that each client is associated with only one messaging address, though this need not be the case and the embodiments disclosed within this specification are not intended to be limited in this regard.

Consider the case in which a user of client 110 has activated an OOO function for his/her messaging account, which is associated with client 110. In activating the OOO function, the user specifies an end time when the OOO function is intended to terminate or become deactivated. The end time is the time that the user of client 110 expects to be back in the office and/or have access to messaging system 100.

As shown, client 105 sends a message 125 to client 110. Client 110 is the original or intended recipient of message 125. Since message 125 is sent while the OOO function for client 110 is active and prior to the end time, server 120 sends automated reply 135 to client 105 indicating that the user of client 110 is currently out of the office.

In accordance with another aspect, the OOO function can continue to operate beyond the end time until a deactivation condition is detected. In the example pictured in FIG. 1, a deactivation condition has not been detected and the current time is now after, or later, than the end time. Accordingly, server 120 forwards message 125 to an alternate messaging address represented as client 115. In addition, server 120 can send a second, or alternate, automated reply, i.e., automated reply 140, to client 105. Automated reply 140, for example, can state that message 125 has been forwarded to an alternate recipient and/or that the user of client 110 is still not in the office.

FIG. 1 is an illustrative example. In one aspect, messaging system 100 is an email system. As such, clients 105, 110, and 115 are email clients and server 120 is an email server. Further, messages are emails. Messaging system 100, however, can be implemented as any of a variety of other, different messaging systems in which an OOO function is implemented. In another example, messaging system 100 is implemented as an instant messaging (IM) system. In that case, server 120 is an IM server; clients 105-115 are IM clients; and messages are instant messages.

As discussed, in one aspect, the OOO function and corresponding message processing is performed by a server such as server 120. The OOO function can be invoked by a user accessing server 120 via client 110 and/or another user interface (UI) such as a Web interface for server 120 or the like. While FIG. 1 is described with reference to server 120 implementing the OOO function, in another aspect, the OOO function can be implemented within or by client 110, presuming that client 110 remains operational. The embodiments disclosed within this specification are not intended to be limited by the particular network node in which the OOO function is implemented.

Figure 2:
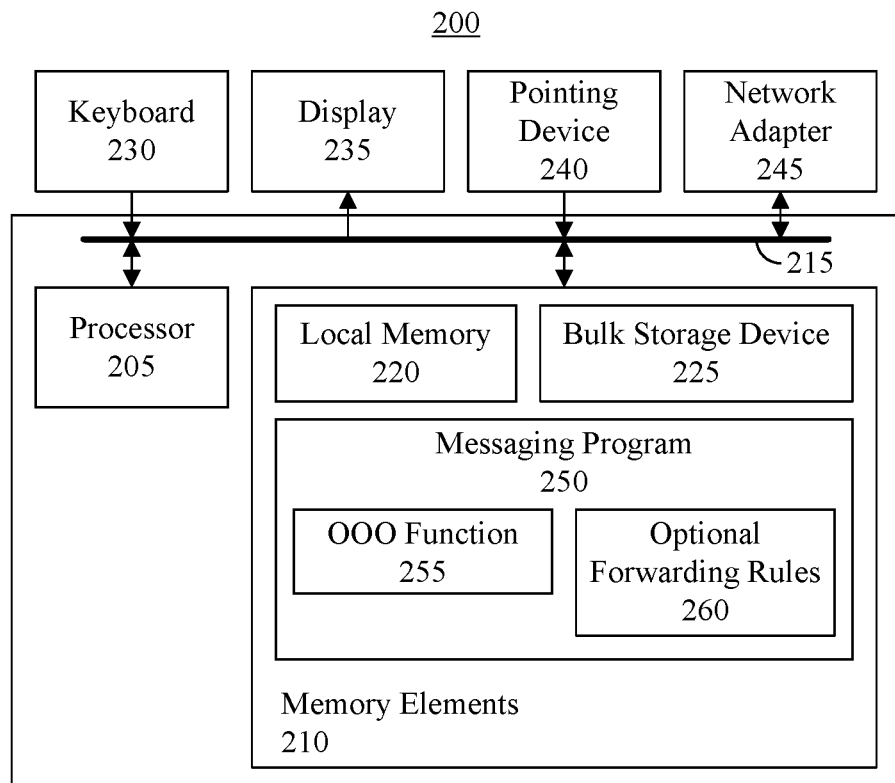
FIG. 2 is a block diagram illustrating an exemplary data processing system configured for out-of-office message processing.

FIG. 2 is a block diagram illustrating an exemplary data processing system (system) 200 configured for out-of-office message processing. In one aspect, system 200 represents a client system such as client 110 of FIG. 1. In another aspect, system 200 represents a server such as server 120 of FIG. 1.

As pictured, system 200 includes at least one processor (e.g., a central processing unit) 205 coupled to memory elements 210 through a system bus 215 or other suitable circuitry. System 200 can store program code within memory elements 210. Processor 205 executes the program code accessed from memory elements 210 via system bus 215. In one aspect, for example, system 200 is implemented as a computer or other programmable data processing apparatus that is suitable for storing and/or executing program code.

It should be appreciated, however, that system 200 can be implemented in the form of any system including a processor and memory that is capable of performing and/or initiating the functions and/or operations described within this specification. As such, system 200 can be implemented in any of a variety of different form factors. Examples of different varieties of system 200 can include desktop computers, tablet computers, portable computers, mobile phones, or the like.

Memory elements 210 include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. System 200 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, wireless transceivers, and Ethernet cards are examples of different types of network adapters 245 that can be used with system 200.

As pictured in FIG. 2, memory elements 210 store a messaging program 250. In one aspect, when system 200 represents a client, messaging application 250 is implemented as client-side messaging software. In another aspect, when system 200 represents a server, messaging program 250 is implemented as server-side messaging software. Messaging program 250 implements OOO message processing using OOO function 255 and optional forwarding rules 260. Messaging program 250, being implemented in the form of executable program code, is executed by system 200 and, as such, can be considered an integrated part of system 200. Messaging program 250, the various items included within messaging program 250, e.g., OOO function 255 and/or optional forwarding rules 260, and the various data items operated upon by messaging program 250, are functional data structures that impart functionality when employed as part of system 200.

Upon executing messaging program 250, system 200 performs and/or implements the various operations and/or functions described within this specification. In one aspect, the alternate messaging address to which a message is forwarded as described herein can be selected from a plurality of different potential messaging addresses based upon one or more of optional forwarding rules 260. For example, each of rules 260, which can be specific to a messaging account, can indicate the conditions under which a particular message is to be forwarded to a given alternate messaging address. In one aspect, the attributes used to determine, or select, the alternate messaging address include attributes relating to the messaging address of the sender of the message that is being processed. Further details relating to optional rules and OOO messaging processing are described with reference to the remaining figures.

FIG. 3 is a block diagram illustrating an exemplary window 300 of a UI used for an OOO function. Window 300 can be generated and presented upon a display, e.g., display 235 of system 200. For example, window 300 can be generated by a client whether rendered from a messaging program executing therein or using a browser from markup language and/or program code received from a server. In any case, window 300 includes a plurality of controls and fields for specifying the various operational parameters for implementing the OOO function.

Selection of control 305 turns off the OOO function. Selection of control 310 turns on the OOO function. When control 310 is selected, controls 315-345 are enabled. Otherwise, controls 315-345 are disabled. When control 310 is selected, a start time for the OOO function is specified. Within this specification, a "start time" and/or an "end time" mean a date or a date in combination with a time of day. The start time indicates when OOO message processing is to start and, as such, becomes active. The end time is the time when OOO message processing stops and the OOO function is deactivated. Control 325 is a text box configured to receive user-specified text that is used for the body of a message that is sent as the automated reply when a message is received and the OOO function is active.

When control 330 is not selected, control 320 for specifying an end time determines the actual time that OOO message processing terminates and the OOO function is disabled. When control 330 is selected, however, the end time specified by control 320 becomes a "scheduled" end time, or an intended end time. More particularly, when control 330 is selected, the OOO function is deactivated only responsive to enumerated deactivation conditions, but not due to the occurrence of the end time specified using control 320. The monitoring or detection of the deactivation conditions, apart from a user manually deactivating the OOO function, begins only after the scheduled end time specified by control 320.

Control 335 allows the user to specify an extended end time. An extended end time also is a date or a date in combination with a time of day. The extended end time occurs after the end time. Typically, the extended end time is a predetermined amount of time after the scheduled end time. It should be appreciated that while control 335 is configured to receive a date and (optionally) a time, in another aspect, a control can be provided that allows the user to specify an amount of time, e.g., 1 day, that is added to the scheduled end time. In either case, an extended end time is specified when control 330 is selected.

Control 340 is a text box configured to receive user specified text that is used as the body of an automated reply. More particularly, the text entered in control 340 is used as the body of an alternate, or second, automated reply that can be sent when the OOO function is active. In general, the text in control 340 is sent when the OOO function is active, after the extended end time, and when no deactivation condition has been detected.

Control 345 allows a user to specify one or more forwarding rules that dictate the particular alternate messaging address(es) to which received messages are to be forwarded. In one example, a single forwarding rule can be entered in the form of a messaging address to which all messages are forwarded. In another example, multiple forwarding rules can be specified. Each forwarding rule can specify a different alternate messaging address and an attribute of the message that is received that causes the forwarding rule to be applied. One example of a forwarding rule can specify that any message received from a particular individual, a particular domain, etc., is to be forwarded to messaging address A. Another example of a forwarding rule can specify that any other message is to be forwarded to messaging address B. In this manner, particular ones of forwarding rules are correlated with the incoming message to which an automated reply is to be provided, e.g., using attributes of the incoming message.

FIG. 4 is a timeline illustrating an example of out-of-office message processing. The timeline of FIG. 4 illustrates the processing that is implemented by a system as described with reference to FIGS. 1-3. For example, at time T1 the OOO function is activated. The OOO function is activated by the user choosing to activate the function or by the occurrence of the start time as specified in FIG. 3. In this example, extended OOO message processing has been activated, e.g., by selecting control 330 of FIG. 3. Accordingly, the scheduled end time for OOO message processing is at T2, as specified through control 320 of FIG. 3. The extended end time as specified using control 335, is at time T3. A deactivation condition is detected at time T4.

For purposes of illustration, consider the case in which the OOO function has been activated for a messaging account in accordance with the timeline of FIG. 4. When a message is sent to the messaging account anytime from time T1 up to and including time T2, an automated reply is sent to the sender of the message. For example, the text included in control 325 is placed in the body of the automated reply. When a message is sent to the messaging account after time T2 and up to, and including, time T3, again, an automated reply message is sent to the sender. The automated reply is the same message, e.g., same text or body as used for message, from time T1 to time T2.

When a message is sent to the messaging account after time T3 and no deactivation condition has been detected, additional message processing is performed. More particularly, the message is forwarded to an alternate messaging address pursuant to any applicable forwarding rule(s). Further, the automated reply that is sent to the sender of the message utilizes the text specified in control 340. The alternate messaging address to which the message is forwarded is one that corresponds to a designated backup, supervisor, etc., for the user that is still out of the office.

The processing described that occurs after time T3 continues until a deactivation condition is detected as shown at time T4. One example of a deactivation condition is when the user associated with the messaging account for which the OOO function is active accesses the messaging account. Accessing the messaging account can include logging into the messaging account and/or system, manually turning off the OOO function, checking newly received messages, e.g., an inbox, or the like.

In another aspect, when time T3 occurs without detecting a deactivation condition, the system can identify any messages that were received from time T1 up through time T3. Such messages can be forwarded pursuant to any applicable rules. In another aspect, the system can send a second, e.g., the alternate, automated reply to the senders of such messages. It should be appreciated that the particular action that is to be taken can include sending the alternate automated reply, forwarding the message as specified, or both.

In still another aspect, time T2 can be equal to time T3. In that case, the messaging forwarding and other OOO actions described can be performed any time the current time is after the scheduled end time, e.g., without having to wait for a predetermined amount of time after the scheduled end time to elapse.

Figure 5A:
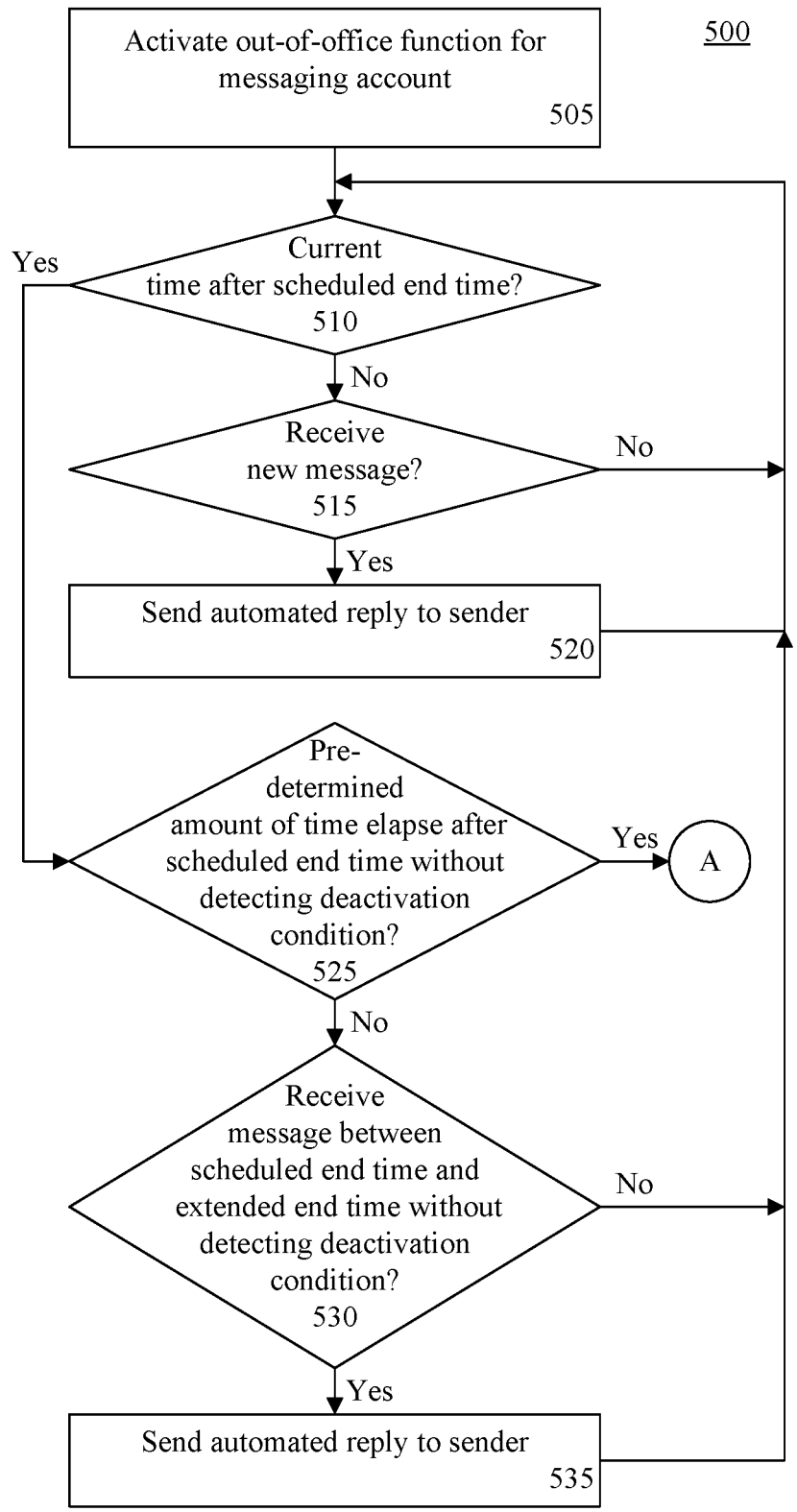
FIGS. 5A and 5B, taken collectively, are a flow chart illustrating a method of out-of-office message processing.
Figure 5B:
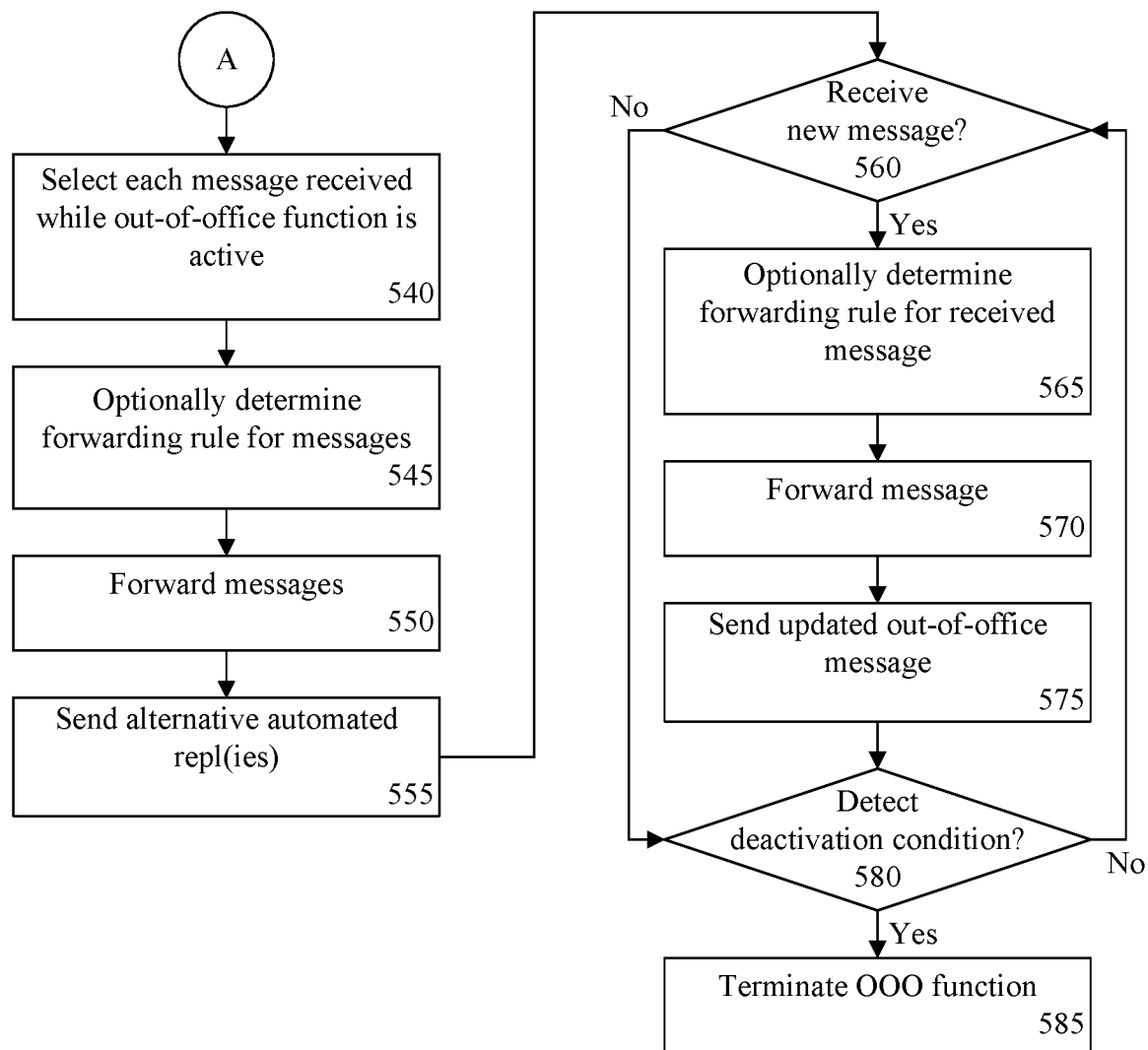

FIGS. 5A and 5B, taken collectively, are a flow chart illustrating a method 500 of out-of-office message processing. Method 500 can be performed by a system as described within this specification. Method 500 begins in block 505 where the OOO function is activated for a particular messaging account. For example, the OOO function is activated within the system responsive to a user input requesting activation for the OOO function on the user's messaging account. For purposes of illustration, it can be assumed that the user has setup the extended OOO message processing in which a scheduled end time has been specified and an extended end time, whether explicitly specified or specified as an amount of time measured from the expiration of the scheduled end time.

In block 510, the system determines whether the current time is after the scheduled end time. The system, for example, compares the current time with the scheduled end time. If the current time is not after the scheduled end time, method 500 continues to block 515. If the current time is after the scheduled end time, method 500 continues to block 525.

In block 515, the system determines whether a message has been received for the messaging account. If so, method 500 continues to block 520. If not, method 500 loops back to block 510 to continue processing. In block 520, the system sends an automated reply to the sender. The automated reply, e.g., a first automated reply, can indicate that the user is expected back by the scheduled end date. After block 520, method 500 loops back to block 510.

Continuing with block 525, the system determines whether the predetermined amount of time has elapsed after the scheduled end time without detecting a deactivation condition. The predetermined amount of time is the amount of time from the scheduled end time to the extended end time. If the predetermined amount of time after the scheduled end time has elapsed (e.g., the current time is after the extended end time) and a deactivation condition has not been detected, method 500 continues to block 540 of FIG. 5B. If not, method 500 proceeds to block 525.

In block 530, the system determines whether a message has been received from the scheduled end time up to and including the extended end time without a deactivation condition having been detected. If so, method 500 continues to block 535. If not, method 500 loops back to block 510 to continue processing. In block 535, the system sends an automated reply to the sender, e.g., the first automated reply. Though not explicitly illustrated for blocks 525 and 530, it should be appreciated that any time a deactivation condition is detected, the OOO function is deactivated and OOO message processing can be discontinued.

As noted, in another embodiment not reflected in FIG. 5, expiration of the predetermined amount of time need not have to occur to implement the OOO actions described such as sending an alternative automated reply and/or forwarding a received message. For example, responsive to determining that the current time is after the scheduled end time and that no deactivation condition has been detected, one or more of the OOO actions can be performed. Similarly, previously received messages, e.g., while the OOO function is active, can be forwarded as described responsive to the current time being after the scheduled end time without having detected a deactivation condition.

Continuing with block 540, each message that has been received while the OOO function is, or has been, active can be selected or identified as the case may be. In block 545, the system optionally determines a forwarding rule that is applicable for each identified message. As noted, in one aspect, the system includes a single forwarding rule that is used for processing all messages. Alternatively, the system includes a plurality of rules each specifying different alternate messaging addresses. In that case, the system correlates the received message with the appropriate rule, e.g., based upon one or more attributes of the received message. In any case, in block 550, the system forwards each selected message to the alternate messaging address in accordance with the rule that has been correlated to, or matched with, the message being forwarded.

In another aspect, in addition to sending an alternative automated reply to each sender of a message received by the system while the OOO function is active, the system can identify any meetings on the user's calendar for which the user is a participant. At a predetermined amount of time prior to the meeting time, if a deactivation condition has not yet been detected, the system can send a message, e.g., the alternative automated reply, to the meeting organizer. For example, 15 minutes prior to the start of a meeting of which the user of the messaging account is an attendee, when the current time is after the extended end time, and when a deactivation condition has not been detected, the system sends an automated reply to the meeting organizer. Accordingly, the meeting organizer is notified that the user is still out of the office and unable to attend the meeting.

In block 555, the system sends an alternative, or second, automated reply to each recipient of a first automated reply, e.g., each sender of a message to the subject messaging account from the time the OOO function was activated up to the current time. The alternative automated reply can indicate that the user of the messaging account is still out of the office. The alternative automated reply further can indicate that the message has been forwarded to another user providing support or acting as a backup for the user that is still out of the office. It should be appreciated that the particular OOO actions that are performed can vary according to user preference. For example, block 550 (and 545) can be performed without block 555, block 555 can be performed without performing block 550 (or 545), or both blocks 550 and 555 can be performed.

In block 560, the system determines whether a new message has been received. If so, method 500 continues to block 565. If not, method 500 proceeds to block 580. In block 565, the system optionally determines a forwarding rule for the received message. The received message can be correlated to, or matched with, a forwarding rule. In block 570, the system forwards the received message in accordance with the forwarding rule determined in block 565. In block 575, the system sends an alternative, e.g., a second, automated reply to the sender of the message received in block 560. As noted, depending upon user preference, forwarding can be enabled in combination with the alternative automated reply, only forwarding can be performed, or only the alternative automated reply can be sent. The particular ones of the OOO actions performed can be specified by the user.

In block 580, the system determines whether a deactivation condition has been detected. If so, method 500 continues to block 585. If not, method 500 loops back to block 560 to continue processing as the current time now exceeds the extended end time. In block 585, responsive to a detected deactivation condition, the system terminates OOO message processing by deactivating or disabling the OOO function.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method, comprising:
   activating, for a messaging account, an out-of-office function having a scheduled end time and a deactivation condition; and
   performing an out-of-office action upon
      a current time being at least a predetermined amount of time after the scheduled end time, and
      the deactivation condition not having occurred.
2. The method of claim 1, wherein
   the deactivation condition includes a user of the messaging account accessing the messaging account.
3. The method of claim 2, wherein
   the accessing the messaging account includes the user checking the messaging account for a message.
4. The method of claim 2, wherein
   the accessing the messaging account includes the user deactivating the out-of-office function.
5. The method of claim 1, wherein
   the out-of-office action includes:
      identifying a messaging address to which a first automated reply was sent as part of the out-of-office function, and
      sending, to the messaging address, a second automated reply different from the first automated reply.
6. The method of claim 1, wherein
   the out-of-office action includes forwarding, responsive to a message being sent to the messaging account, the message to an alternative messaging address.

* * * * *